(12) United States Patent
Pernice et al.

(10) Patent No.: US 9,470,955 B2
(45) Date of Patent: Oct. 18, 2016

(54) NANOPHOTONIC SPATIAL LIGHT MODULATOR

(71) Applicant: Karlsruher Institut für Technologie, Karlsruhe (DE)

(72) Inventors: Wolfram Pernice, Karlsruhe (DE); Harish Bhaskaran, Oxford (GB)

(73) Assignee: Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 14/742,449

(22) Filed: Jun. 17, 2015

(65) Prior Publication Data

US 2015/0378183 A1    Dec. 31, 2015

(30) Foreign Application Priority Data

Jun. 18, 2014    (EP) .................................... 14172938

(51) Int. Cl.
*G02F 1/35* (2006.01)
*G02F 1/313* (2006.01)
(Continued)

(52) U.S. Cl.
CPC ........... *G02F 1/3515* (2013.01); *G02B 6/2848* (2013.01); *G02B 6/3546* (2013.01); *G02B 6/3556* (2013.01); *G02B 6/3596* (2013.01); *G02F 1/011* (2013.01); *G02F 1/3137* (2013.01); *G02F 1/3555* (2013.01); *G02F 1/365* (2013.01); *G02B 6/2804* (2013.01);
(Continued)

(58) Field of Classification Search
CPC ........ G02F 1/011; G02F 1/19; G02F 1/3515; G02F 1/3555; G02F 1/365; G02B 6/2804; G02B 6/2848; G02B 6/3542; G02B 6/3556; G02B 6/3596

USPC .............................. 385/1, 2, 4, 8–10, 16, 17
See application file for complete search history.

(56) References Cited

U.S. PATENT DOCUMENTS

| 6,915,032 B1 * | 7/2005 | White | G02F 1/3138 385/17 |
| 7,065,272 B2 * | 6/2006 | Taillaert | B82Y 20/00 359/563 |

(Continued)

OTHER PUBLICATIONS

Pernice, et al., "Photonic non-volatile memories using phase change materials," Appl. Phys. Lett. 101, 171101-1 to 171101-4 (2012).

(Continued)

*Primary Examiner* — Ryan Lepisto
(74) *Attorney, Agent, or Firm* — Foley & Lardner LLP

(57) ABSTRACT

A nanophotonic device includes at least two waveguides located on top of a transparent substrate, which form an intersection point at which a part of a first waveguide simultaneously constitutes a part of a second waveguide. A nanoscale element located on top of the intersection point so that it partially or completely covers the intersection point is switchable between two different states, which differ by a refractive index value. The nanophotonic device is operated by injecting at least two optical pulses into the waveguides. Intensity of the optical pulses is selected so that a superposition of the optical pulses switches the nanoscale element into a desired state. Also disclosed is a nanophotonic matrix array in which parallel waveguides form nanophotonic devices. The nanophotonic matrix array may be used as a spatial light modulator (SLM), as an optical mirror, as an optical absorber, or as a tunable optical grating array.

21 Claims, 4 Drawing Sheets

Figure 1:
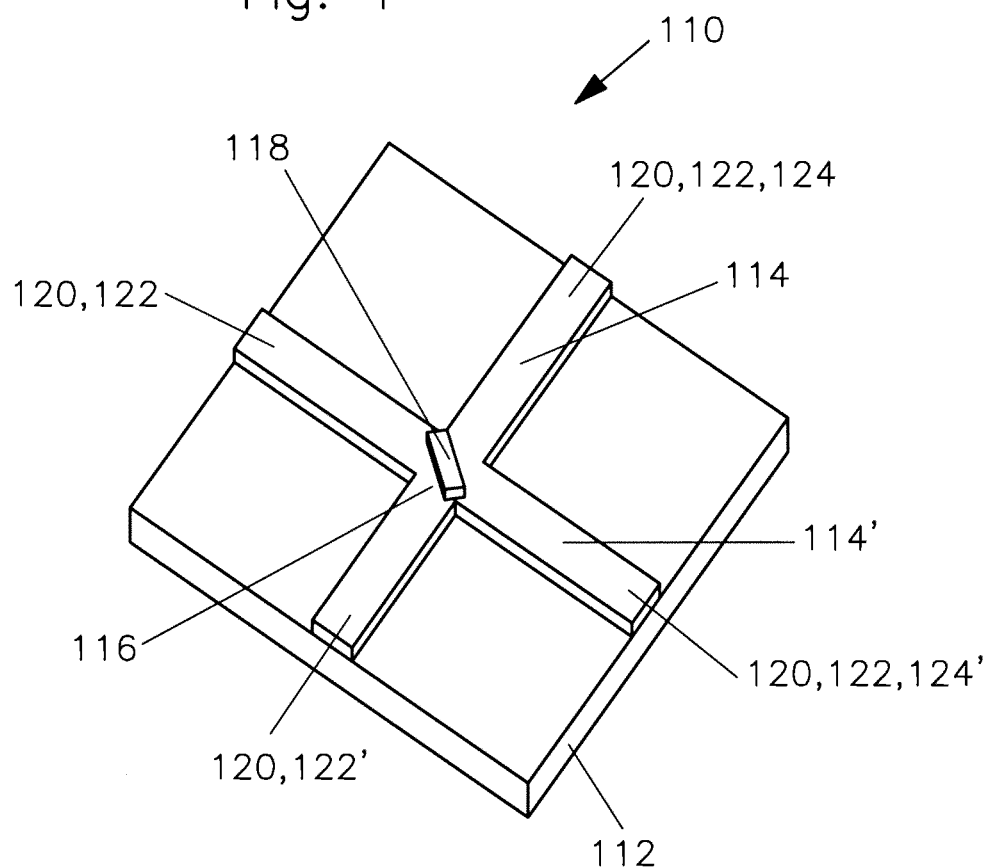

(51) Int. Cl.
G02B 6/35 (2006.01)
G02F 1/355 (2006.01)
G02F 1/365 (2006.01)
G02F 1/01 (2006.01)
G02F 1/19 (2006.01)
G02B 6/28 (2006.01)

(52) U.S. Cl.
CPC ............... *G02B 6/3542* (2013.01); *G02F 1/19* (2013.01); *G02F 1/3521* (2013.01)

(56) References Cited

U.S. PATENT DOCUMENTS

| | | | |
|---|---|---|---|
| 2004/0066999 A1 | 4/2004 | Sakamoto et al. | |
| 2006/0140535 A1* | 6/2006 | Tsuda | G02B 6/12004 385/16 |
| 2007/0053628 A1* | 3/2007 | Park | G02F 1/0121 385/14 |
| 2010/0272386 A1* | 10/2010 | Fu | G11C 13/0004 385/14 |
| 2014/0105553 A1* | 4/2014 | Kim | G02F 1/011 385/123 |

OTHER PUBLICATIONS

Kokubun, "Vertically coupled microring resonator filter for integrated add/drop node," IEICE Trans. Electron., vol. E88-C, No. 3, pp. 349-362 (2005).

Rudé, et al., "Optical switching at 1.55 μm in silicon racetrack using phase change materials," Appl. Phys. Lett. 103, 141119-1 to 141119-4 (2013).

Gholipour, et al., "Chalcogenide glass photonics: Non-volatile, bi-directional, all-optical switching in phase-change metamaterials", Lasers and electro-optics (CLEO), 2012, Conference on, IEEE, pp. 1-2 (2012).

Dionne J. A. et al.: "Silicon-Based Plasmonics for On-Chip Photonics", IEEE Journal of Selected Topics in Quantum Electroics, vol. 16, No. 1, pp. 295-306 (2010).

Jiang, et al., "Photon-Induced Total-Internal-Reflection All-Optical Switches", IEEE Photonics Technology Letters, vol. 16, No. 2, pp. 443-445 (2004).

* cited by examiner

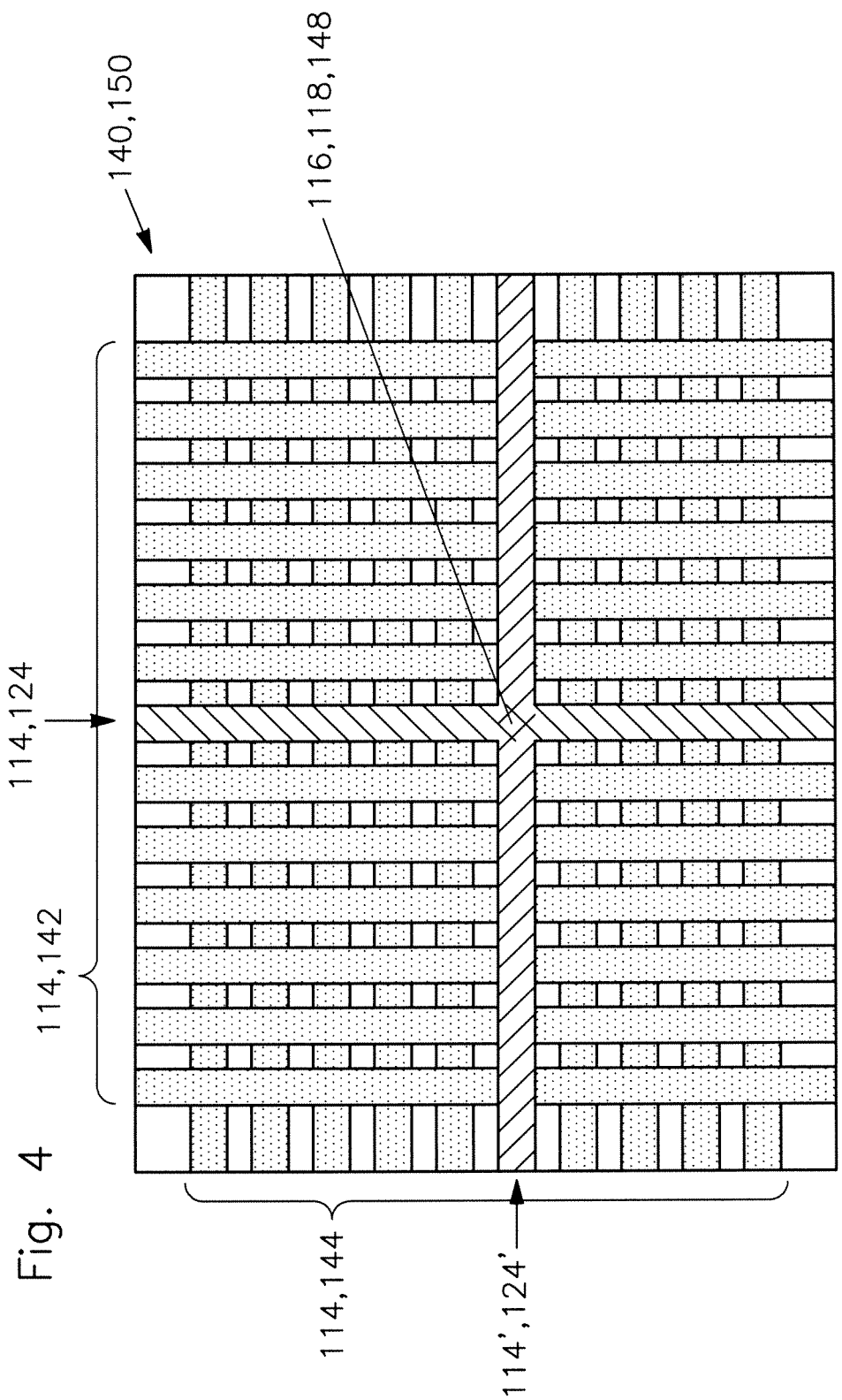

NANOPHOTONIC SPATIAL LIGHT MODULATOR

CROSS-REFERENCE TO RELATED APPLICATION

This application claims priority from European Patent Application No. 14172938.4, filed Jun. 18, 2014. The contents of this application is incorporated herein by reference in its entirety.

FIELD OF THE INVENTION

The present invention is related to a nanophotonic device, to methods for its manufacturing and operating as well as to a nanophotonic matrix array and its use, in particular as a nanophotonic spatial light modulator (SLM).

RELATED ART

The present invention is located in the fields of nanophotonics and integrated optics as well as in the field of thin film technology with phase-change materials. A combination of these formerly separate fields of technology is intended to provide a new technology platform in order to implement integrated circuits, in particular nanophotonic integrated circuits, comprising additional degrees of freedom when compared to traditional photonic integrated circuits.

Currently, phase-change materials (PCMs) are of considerable interest owing to their potential for implementing optical memories. The reason therefore is based on the observation that PCMs offer a considerable variation in refractive index upon a reversible switching from a first (amorphous) state to a second (crystalline) state or vice-versa, thus, providing a convenient way to implement bits which may be read out optically. In addition, an integration of PCMs into nanophotonic circuits exhibits a potential for accessing this feature in order to provide tunable devices. Within this regard, it is of particular interest that PCMs may also be switched all optically, thus, not requiring any electrical connections or contacts in contrast with previous optical memories.

As an example, W. H. P. Pernice, and H. Bhaskaran, *Photonic non-volatile memories using phase change materials*, Appl. Phys. Lett. 101, 171101, 2012, propose an all-photonic, non-volatile memory, and a nanoscale element based on a phase-change film deposited on nanophotonic waveguides fabricated from silicon nitride. For this purpose, a micro-ring resonator partially covered with the chalcogenide-based phase-change material $Ge_2Sb_2Te_5$, usually abbreviated to "GST", is used, wherein the application of GST, which provides a considerable reversible variation in the refractive index from the amorphous to the crystalline state and vice-versa, allows reversibly controlling both an extinction ratio and a resonance wavelength of a micro-cavity located between the micr-ring resonator and a control port.

As a further example, M. Rudé, J. Pello, R. E. Simpson, J. Osmond, G. Roelkens, J. J. G. M. van der Tol, and V. Pruneri, *Optical switching at 1.55 μm in silicon racetrack using phase change materials*, Appl. Phys. Lett. 103, 141119, 2013, describe an optical switch implemented as a silicon micro-ring resonator on a silicon-on-insulator substrate, wherein the resonator comprises a coupling region which is partially covered with a layer of GST. Herein, light enters the resonator via an evanescent field as provided by a silicon waveguide being located in the vicinity of the resonator.

B. Gholipour, J. Zhang, F. Al-Saab, K. F. MacDonald, B. E. Hayden, D. W. Hewak, and N. I. Zheludev, *Chalcogenide Glass Photonics: Non-volatile, Bi-directional, All-optical Switching in Phase-change Metamaterials*, CLEO 2012, p. 1-2, 2012, describe devices comprising a film of GST glass sputtered on a transparent substrate and inert $ZnS/SiO_2$ buffer and capping layers on either side of the GST film. Herein, phase transitions were initiated uniformly across large areas of the GST film by single-pulse laser excitation, which produced marked changes in transmission and reflection spectra in the GST film.

U.S. Pat. No. 6,915,032 B1 discloses an optical cross-point switch structure, the switch permitting light signals to be diverted from any arbitrary number of input ports any or several of an arbitrary number of output ports. The switch comprises intercepting optical waveguides on a planar substrate, wherein an optical signal may allow an optical coupling between different waveguides at the cross-point.

Y. Kokubun, *Vertically coupled Microring Resonator Filter for Integrated Add/Drop Node*, IE-ICE Trans. Electron. 88, p. 349-362, 2005, describes a nanoscale switching element located at an intersection point of two intersecting waveguides on a substrate, wherein the switching element comprising a microring is frequency tunable simply by heating the device with respect to temperature.

Further switching elements using silicon-based materials are, for example, disclosed in US 2004/0066999 A1, in J. A. Dionne, L. A. Sweatlock, M. T. Sheldon, A. P. Alivisatos, and H. A. Atwater, *Silicon-Based Plasmonics for On-Chip Photonics*, IEEE J. Select. Top. Quant. Electron. 16, p. 295-306, 2010, and in X. Q. Jiang, J. Y. Yang, H. Z. Zhan, K. J. Chen, Y. Tang, X. H. Li, and M. H. Wang, *Photon-Induced Total-Internal-Reflection All-Optical Switches*, IEEE Photonics Tech. Lett. 16, p. 443-445, 2004.

However, the focus of the present invention addresses existing limitations in implementing scalable, fast switchable optical components, in particular spatial light modulators (SLMs). As generally used, an SLM is an arbitrary device allowing spatially modulating a beam of light with respect to its intensity and/or phase. SLMs are optical components which become more and more important for free-space optical communication and modulation. Within this regard, they are used to generate desired beam profiles and/or to facilitate optical beam steering. In addition, SLMs may also be used for holographic data storage and optical filter implementations. Consequently, a broad range of optical applications rely on their availability.

Thus, the SLM comprises a number of basic elements constituting individual refractive index pixels which may be tuned with respect to their refractive index, in particular over a wide range of intensity and/or phase, particularly in order to implement a desired refractive index matrix on a given surface. However, since only a few classes of materials exhibit a pronounced tenability of the refractive index, current optically addressed SLMs use a number of small liquid crystal cells which constitute the individual refractive index pixels of the SLM.

The frequency at which SLMs may be operated is in particular determined by the speed of an integrated optical system, including the individual refractive index pixels. As a result, optical elements which comprise liquid crystals are inherently slow owing to the limited switching speed of liquid crystals which usually lies in a low kilohertz range, thus, limiting the switching speed of SLMs being equipped with liquid crystals to a frequency range which is far below current telecommunication data manipulation rates. In addition, current SLMs based on liquid crystal elements are only capable of covering a limited wavelength range. However, optical devices which may be used at an arbitrary wavelength, in particular for optical multiplexing, high-speed optical communication, or spectral-beam shaping, are highly desirable.

Problem to be Solved

It is therefore an objective of the present invention to provide a nanophotonic device, methods for its manufacturing and operating as well as a nanophotonic matrix array and its use in order to overcome the above-mentioned problems and shortcomings of the present state of the art.

SUMMARY OF THE INVENTION

This problem is solved by a nanophotonic device, methods for its manufacturing and operating as well as a nanophotonic matrix array and its use with the features of the independent claims. Preferred embodiments, which might be realized in an isolated fashion or in an arbitrary combination, are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, the present invention relates to a nanophotonic device. As further used herein, the "nanophotonic device" may refer to an arbitrary device which may be adapted for an application within the field of nanophotonics. Herein, the term "nanophotonics", also denoted as "nano-optics", is usually employed to describe both the basic research and the industrial applications with regard to light which may interact with structures exhibiting features which comprise dimensions below the wavelength, in particular below less than half of the wavelength, of the light interacting with the mentioned structure, which may also be denoted as a "nanostructure". As further used herein, the term "light" may not be limited to radiation with respect to the visible part of the electromagnetic spectrum between 380 nm and 780 nm but may also extend to the adjoining realms of ultra-violet (UV) light between 10 nm and 380 nm, preferably between 200 nm and 380 nm, more preferably between 300 nm and 380 nm, as well as to the realm of infra-red (IR) light with wavelengths between 1 mm and 780 nm, in particular between 3 µm and 780 nm, more particular between 1200 nm and 780 nm.

In contrast to classical optics, in nanophotonics the interaction of light with nanostructures may lead to a confinement of the electromagnetic field to the respective nanoscale feature which may result in an evanescent near-field which may particularly occur in the vicinity of the nanostructure. Consequently, two nano-optic components, such as a nanophotonic component, for example, a ring-resonator, and a nanophotonic waveguide, may be assigned to be in the "vicinity" of each other as long as a measurable near-field as emitted by one of the nano-optic components may be measurable or detectable by the other of the nano-optic components.

The nanophotonic device according to the present invention comprises a substrate. As further used herein the "substrate" may refer to a usually planar body, particular on top of which at least one layer may be placed, particularly for manufacturing an integrated device. With regard to the present invention, the substrate comprises an optically transparent material, preferably glass, quartz, or sapphire, wherein the optically transparent material may exhibit a first refractive index. As used herein, the term "refractive index" may constitute a material constant which may express a response of the material to an incident light beam with respect to a change from a sine of an angle of incidence to the sine of an angle of refraction. For most optically transparent materials, the refractive indices may take a value between 1 and 3, such as for glass, quartz, or sapphire, wherein the first refractive index takes a value around 1.5 within the visible spectrum range.

As a generalization, a "complex refractive index" may also be defined by taking into account that a part of the incident light passing through the material may be absorbed. Such a feature may particularly be observed in a material, such as a thin metallic film, in which the real part of the complex refractive index may be negligible whereas the complex part of the refractive index may take a considerable value. Thus, in nanophotonics, in particular due to the effect of the non-negligible contribution of the imaginary part of the refractive index, surface plasmons may be created on a surface of the material, for example, on the surface of the thin metallic film. The surface plasmons which may be confined to the surface of the respective material may strongly interact with the incident light and may, additionally or as an alternative, be used as waves which may propagate along the surface of the substrate.

Further, the nanophotonic device according to the present invention comprises at least at least two nanophotonic waveguides, which are located on top of the substrate. As used herein, the term "top" may refer to one side of an extended planar substrate on which the respective nanophotonic waveguides are located while the other side of the extended planar substrate, which may also be denoted by the term "bottom", may be kept free of nanophotonic waveguides and may, thus, be used for other purposes but may, in general, also comprise further nanophotonic waveguides. In a preferred embodiment, the substrate, in particular the bottom of the substrate, however, may further at least partially be coated with an anti-reflection coating, wherein the anti-reflection coating may particularly be configured for limiting a back-reflection of an incident light beam when leaving the bottom of the substrate.

With regard to the present invention, the nanophotonic waveguides may comprise a material which may exhibit a second refractive index, wherein a value of the second refractive index may exceed the value of the first refractive index. Such a difference with regard to the respective refractive indices may particularly be useful in order to obtain a tight modal confinement of a light wave travelling along the respective nano-optic component.

Thus, in a particularly preferred embodiment, wherein the material with the first refractive index may comprise an the optically transparent material like glass, quartz, or sapphire, a layer of a wide electronic bandgap material may be placed on the substrate, wherein from the layer of the wide-band gap material the desired nanophotonic waveguides may be created. Herein, the wide-band gap material may particularly be useful in order to enable a broad-band optical transparency within the layer. With regard to the present invention, the wide-bandgap material may particularly be selected to comprise a nitride semiconductor, in particular a III-nitride semiconductor, such as silicon nitride or aluminum nitride.

Alternatively, in a further preferred embodiment, a layer of a transparent conducting oxide, preferably indium tin oxide (ITO), may be placed on the substrate, wherein from the layer of the transparent conducting oxide the desired nanophotonic waveguides may be created. In this particular embodiment, electronic switching may be preferred since the transparent conducting oxides, in particular ITO, are known as a material particularly suited for electronic switching purposes.

Further, in a particular case, wherein the nanophotonic device may especially be adapted for being used in the infra-red spectral range, a layer of silicon which usually exhibits the properties required for the infra-red spectral range may be placed on the substrate in order to create the desired nanophotonic waveguides therefrom.

As further used herein, the term "nanophotonic waveguide" may refer to a structure located on the substrate which may primarily perform a function of guiding a light wave along the nanostructure of the waveguide, primarily for its transport. For this purpose, desired waveguiding properties may be achieved by selecting a defined thickness of the waveguiding layer and/or by choosing a specific width of the waveguiding layer which may be provided as a planar waveguide. Thus, in a particularly preferred embodiment, the waveguides may comprise a thin film, wherein the thin film may exhibit a thickness within a range from 1 nm to 20 nm, preferably within a range from 5 nm to 10 nm. As used herein, a "thin film" may refer to a planar layer deposited on the substrate, wherein the thickness of the planar layer may comprise values in the given range and may, thus, be much less, i.e. at least one order of magnitude, compared to the thickness of the substrate.

Preferably, fully etched waveguides or partially etched rib waveguides may be employed to guide the nanoscale through the respective waveguide. Further, the waveguides may be terminated, preferably at both sides, by suitable optical coupling ports, such as grating couplers, polished facets, or grooved optical fiber access, such as known from the state of the art. Consequently, the optical coupling ports may open a way to couple light into a respective waveguide into at least one side, preferably, into both sides. In addition, rerouting may be employed in order to enhance an optical intensity within the waveguide.

According to the present invention, the nanophotonic device comprises at least two waveguides located on the substrate, wherein the at least two waveguides are located in a manner on the substrate that they comprise an intersection point. As further used herein, the term "intersection point" may refer to a part of a first waveguide which, simultaneously, constitutes a part of a second waveguide. As used herein, the term "intersection point" may, thus, not literally relate to a single point but rather to a nanoscale extended area as located on the substrate which may perform a function of bringing together light as provided by two separate waveguides. As already described above, each waveguide may comprise a sub-wavelength optical confinement, thus, providing a high intensity of optical modes which propagate along the nanostructure designated as nanophotonic waveguide. According to the present invention, by coupling light into the intersection point from two intersecting waveguide, may, therefore, further enhance the intensity of the light within the area of the intersection point.

Further according to the present invention, a nanoscale element is located at the intersection point, wherein the nanoscale element is switchable between two different states, wherein the two different states differ by a refractive index value. As further used herein, the term "nanoscale element" may refer to an arbitrary nanostructure as previously defined, wherein the nanoscale element may comprise a thin film, wherein the thin film may exhibit a thickness in a range from 1 nm to 20 nm, preferably in a range from 5 nm to 10 nm, while the nanoscale element may show an extension within the other two dimensions that it may partially or completely cover the intersection point at which it may be located.

Preferably, the nanoscale element may have dimensions in a range from 10 nm×10 nm to 100 µm×100 µm, wherein, however, the size of the nanoscale element may be limited by the dimensions of the waveguide. Within the waveguide, single-mode and/or multi-mode geometries may be employed. Whereas for small devices single-mode operation may be preferred, multi-mode layouts may be advantageous when large GST elements are used.

As already mentioned above, the nanoscale element is switchable between two different states, wherein the two states differ by their refractive index value. As generally used, the term "state" refers to a physical and/or electronic configuration of a material, such as a crystalline state or an amorphous state, which the respective element may adopt for any reason, such as by external influence or as a result of a relaxation process.

In a particular preferred embodiment, the nanoscale element may assume a shape of a nanoantenna. With respect to the present invention, possible geometries for the nanoantenna may include bow-tie layouts, coupled dipole antennas, or single rectangular structures. In addition, in coupled-antenna geometries plasmonic enhancement effects may be employed in order to reduce an overall energy as required for an optical switching of the nanoantenna.

In a particularly preferred embodiment, the nanoscale element comprises a phase-change material (PCM), wherein the PCM may preferably comprise a chalcogenide glass, most preferably GST as described above. For the purposes of the present invention, an application of the phase-change material GST is particularly preferred since GST provides a considerable variation in its refractive index when a change from the amorphous to the crystalline state or vice-versa appears. As will be described below in more detail, an injection of optical pulses into the two waveguides which intersect at the at the intersection point where the respective nanoscale element may be located may lead to a high optical intensity due to a superposition of the two optical pulses at the intersection point, thus, allowing the switching between the two different states of the nanoscale element, in particular by applying suitable forms of the optical pulses. As will be described below in more detail, by selecting two specific nanophotonic waveguides, the desired nanoscale element located at the intersection point between the two specific waveguides may be addressed.

In a further aspect, the present invention relates to a method for manufacturing a nanophotonic device, in particular the nanophotonic device as described above and/or below. In addition, the method for manufacturing the nanophotonic device may mutatis mutandis also be applicable in manufacturing the nanophotonic matrix array as described below in more detail. The method for manufacturing the nanophotonic device according to the present invention comprises at least the following steps (a) to step (d), wherein, however, additional steps, such as step (e) or any other step which may not particularly described here, may further be performed. Preferably, the method steps (a) to (d) may be performed in the given order, commencing with step (a), continuing first with step (b) and then step (c), and finishing with step (d), wherein, however, a subsequent step may partially be performed concurrently with a previous step.

According to step (a), a substrate is provided, preferably the substrate as described above. Accordingly, the substrate may comprise an optically transparent material, preferably glass, quartz, or sapphire, with a first refractive index, and the substrate is equipped with at least one reception for at least one external connector, wherein the reception is coupled to at least one connector waveguide.

According to step (b), a layer of a material is placed onto the substrate, preferably by depositing the material with a second refractive index as a thin film on the top of the substrate directly or on top of an underlying buffer layer as previously deposited onto the substrate. As an example, a thin film of aluminum nitride may be sputter-deposited on the substrate, wherein a morphology of the aluminum nitride film may be selected which may or may not be crystalline in plane and which may exhibit a c-axis oriented film growth out-of plane as defined by the substrate. As a further example, silicon nitride films may also be effectively deposited on the substrate by employing low-pressure chemical vapor deposition (CVD). Alternatively, a layer of a transparent conducting oxide, in particular comprising indium tin oxide (ITO), or of silicon may also be deposited onto the substrate, in particular for the reasons as described above in more detail.

According to step (c), at least two nanophotonic waveguides are created within the layer of the material as placed on top of the substrate. The creating of the nanophotonic waveguides may, preferably, comprise a first step of high resolution lithography, followed by a second step of thin film structuring, in particular through etching. By application of step (c), thus, the at least two nanophotonic waveguides may be created. Both aluminum nitride and silicon nitride, as preferably used for step (b), may exhibit a value above 1.5 and up to 3.0, preferably between 1.6 and 2.5, i.e. around 2.0, for the second refractive index, thus, enabling a strong optical confinement with sub-wavelength precision within the nanophotonic waveguides located on the substrate, wherein the substrate may exhibit a first refractive index with a value, such as 1.5, being preferably be below the value for the second refractive index. Similar values may be obtained for the layer of the transparent conducting oxide, such as ITO, or of silicon, if applicable.

According to step (d), at least one nanoscale element is provided, wherein the nanoscale element is selected as being switchable between two different states, wherein the two states differ by a refractive index value. Preferably, the nanoscale element may be implemented by using suitable fabrication procedures, such as a lift-off method which is known to offer a nanometer resolution.

In a preferred embodiment, the method according to the present invention may further comprise step (e). Accordingly, at least one optical grating coupler may be provided as one optical port for providing a connection to an external optical fiber. Herein, optical grating couplers are preferred since they may allow an out-off-plain alignment of the nanophotonic device to at least one external optical fiber. In addition, since the grating couplers usually may not require much area, a plurality of optical ports may be provided for allowing parallel access within the nanophotonic matrix array as described below in more detail. This kind of arrangement may be particularly suitable in a case where a fiber array comprising a plurality of optical fibers aligned next to each other may be employed. Alternatively or in addition, a fiber-butt coupling may also be used in V-grooves which may be provided at least one side of the nanophotonic device. Irrespective of the selected embodiment, thus, a precise optical alignment of at least one external optical fiber to the nanophotonic device according to the present invention may be achieved.

For further details concerning the methods according to the present invention, reference may be made to the description of the nanophotonic device and/or the nanophotonic matrix array as presented above and/or below.

In a further aspect, the present invention relates to a method for operating the nanophotonic device as described above and/or below. Accordingly, at least two optical pulses are injected into at least two waveguides, wherein the at least two waveguides comprise an intersection point. As generally used, the term "optical pulse" may refer to light wave which may not be provided in a continuous manner but over a comparatively short period of time, thus, covering only a few wavelengths of the light wave, wherein, within the respective period of time, the intensity of the light may first increase until it may reach a maximum amplitude whereafter the intensity may then decline. Typically, the optical pulses as used for operating the nanophotonic device according to the present invention exhibit a pulse width within the nanosecond and/or picosecond range. Shorter pulses can also be employed by adjusting the overall energy of the optical pulse in order to provide sufficient energy for switching the respective optical pulse. Within this regard, the length of the optical pulse may be adjusted individually for the two phase transitions as mentioned if required.

In accordance with the present invention, the intensity of the at least two optical pulses is hereby selected in a manner that the superposition of the at least two optical pulses at the intersection point may provide a combined intensity being capable of switching the nanoscale element being located at the intersection point into a desired state. As used herein, the "desired state" is selectable from the two different states of the nanoscale element as described above, wherein the two states of the nanoscale element differ by the respective value for the refractive index of the corresponding state.

In a further aspect, the present invention relates to a nanophotonic matrix array. Herein, the nanophotonic matrix array comprises a common substrate, wherein a first plurality of parallel waveguides and a second plurality of parallel waveguides are located on the substrate in a manner that each waveguide of the first plurality of parallel waveguides comprises an intersection point with each waveguide of the second plurality of parallel waveguides. Herein, preferably at each intersection point, a nanoscale element is located, wherein the nanoscale element is switchable between the two different states as described above and/or below.

Within this regard, each specific intersection point unambiguously relates to the two waveguides which form this specific intersection point. Advantageously, this arrangement may allow precisely addressing each intersection point by employing the two respective waveguides which form the specific intersection point. It may, thus, be possible to further enhance the intensity of the light at the intersection point by guiding the two intersecting light waves through the two specific waveguides which meet at the respective intersection point.

In a particularly preferred embodiment, each plurality of waveguides further comprises a plurality of optical ports for providing a connection to an optical fiber array, wherein each optical port preferably comprises an optical grating coupler, such as already described above.

For further details concerning the nanophotonic matrix array, reference may be made to the description of the nanophotonic device as presented above and/or below.

Accordingly, the nanophotonic matrix array may combine a matrix of dielectric waveguides with individual nanoscale elements comprising the suitable phase-change material, wherein each individual nanoscale element may be optically addressed as an individual pixel within the nanophotonic matrix array, thus, allowing implementing arbitrary refractive index profiles which may be switched on a picosecond time scale owing to the ultra-fast phase transition of the phase-change material GST.

In a further aspect, the present invention relates to a use of the nanophotonic matrix array as described above and/or below as a spatial light modulator (SLM), preferably for shaping and/or steering a light beam, in all areas of optics, such as astronomy, microscopy, or lithography. This use is possible due to the matrix of PCM-based spatially addressable refractive index pixels as described above and/or below which is ideally suited to serve as an ultra-fast SLM which may be operated on a nanosecond and/or picosecond time scale. Since the operation principle as described herein comprises a more general approach, further applications may refer to ultra-fast optical filters as well as to applications in beam steering and beam shaping. In addition, since the absorption properties of the phase-change material, such as GST, may be strongly altered, the nanophotonic matrix may also be employed as a tunable optical mirror and/or a tunable optical absorber. Further applications may concern tunable grating structures and/or tunable matrix arrays being capable of operating in the Gigahertz range. Furthermore, a scalability of the nanophotonic device according to the present invention may enable a optical filter shaping on a single chip as well as a combination of a multitude or a plurality of such devices in order to form an integrated system. Consequently, multi-pixel imaging may be possible by manufacturing a large number of nanophotonic devices on the same chip, thus, providing a full two-dimensional image acquisition, preferably at single photon level, on a number of wavelength channels simultaneously.

In addition to the advantageous features as described above, the present invention may ideally be suited for an implementation of a widely tunable optical filter which may be spatially controlled. Using broadband transparent optical materials, such as saphir or glass as the substrate, may provide a large flexibility with regard to the operation wavelength of the nanophotonic matrix array in particular to be used as SLM. Within this respect, the respective device may be adaptable to the desired wavelength by scaling the size of the individual pixels which comprise the individual nanoscale elements from the visible to the infrared wavelength range. In addition, the wavelength range may further be extended by combining optical materials with transparency in the ultraviolet or the further infrared spectral range. Thus, the device according to the present invention may enable an operational bandwidth far above currently available devices and may, therefore, cover wavelengths which are hardly accessible with current SLMs.

Summarizing, the technology platform according to the present invention being related to nanophotonics and phase-change materials may particularly enable a manufacturing of integrated high-performance all-optically tunable photonic circuits. Using PCM nanoscale elements as switchable pixels may benefit from standard nanofabrication routines which are generally considered as fault-tolerant and as enabling fabrication of large-area matrix arrays. Consequently, the nanophotonic device as well as the nanophotonic matrix array according to the present invention may be fully scalable and suitable to implement optical devices, in particular SLMs, with a high pixel density over a large area. As a result, waver-scale fabrication procedures may also be employed here in order to implement functional miniaturized circuits having a potential for a reasonable prized mass production.

SHORT DESCRIPTION OF THE FIGURES

Further optional features and embodiments of the invention will be disclosed in more detail in the subsequent description of preferred embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 2A:
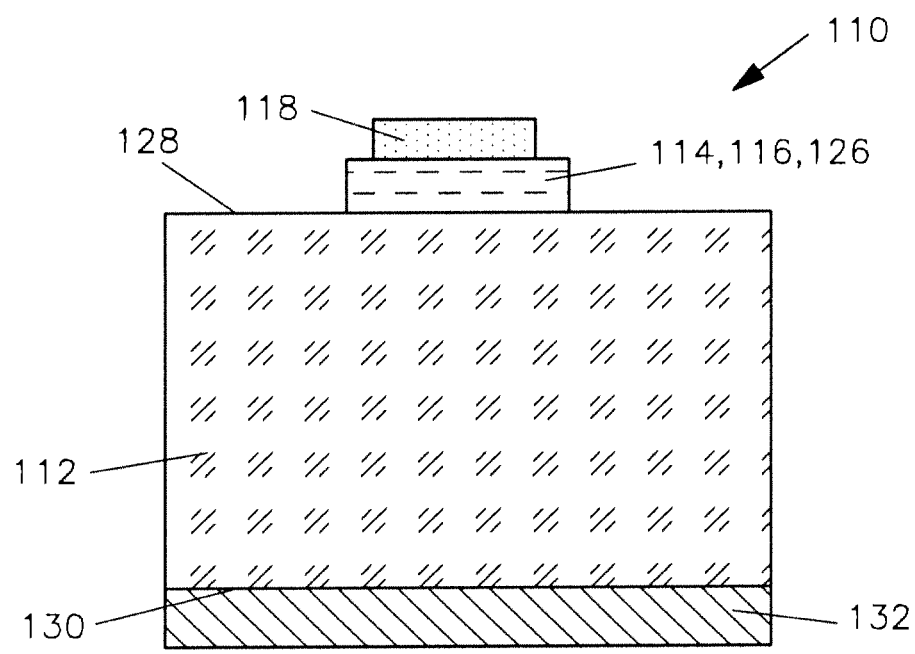
Figure 2B:
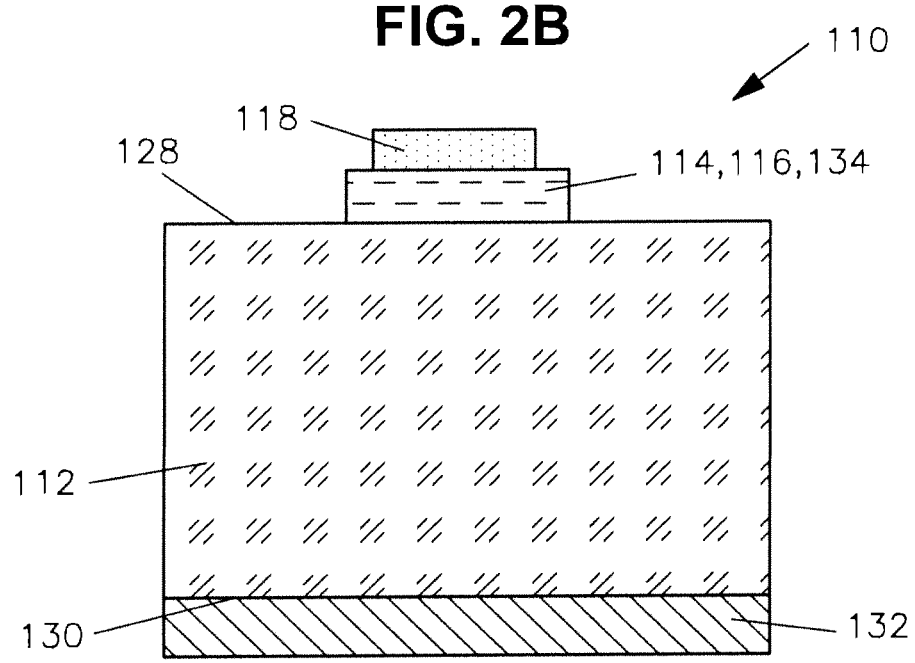
Figure 3:
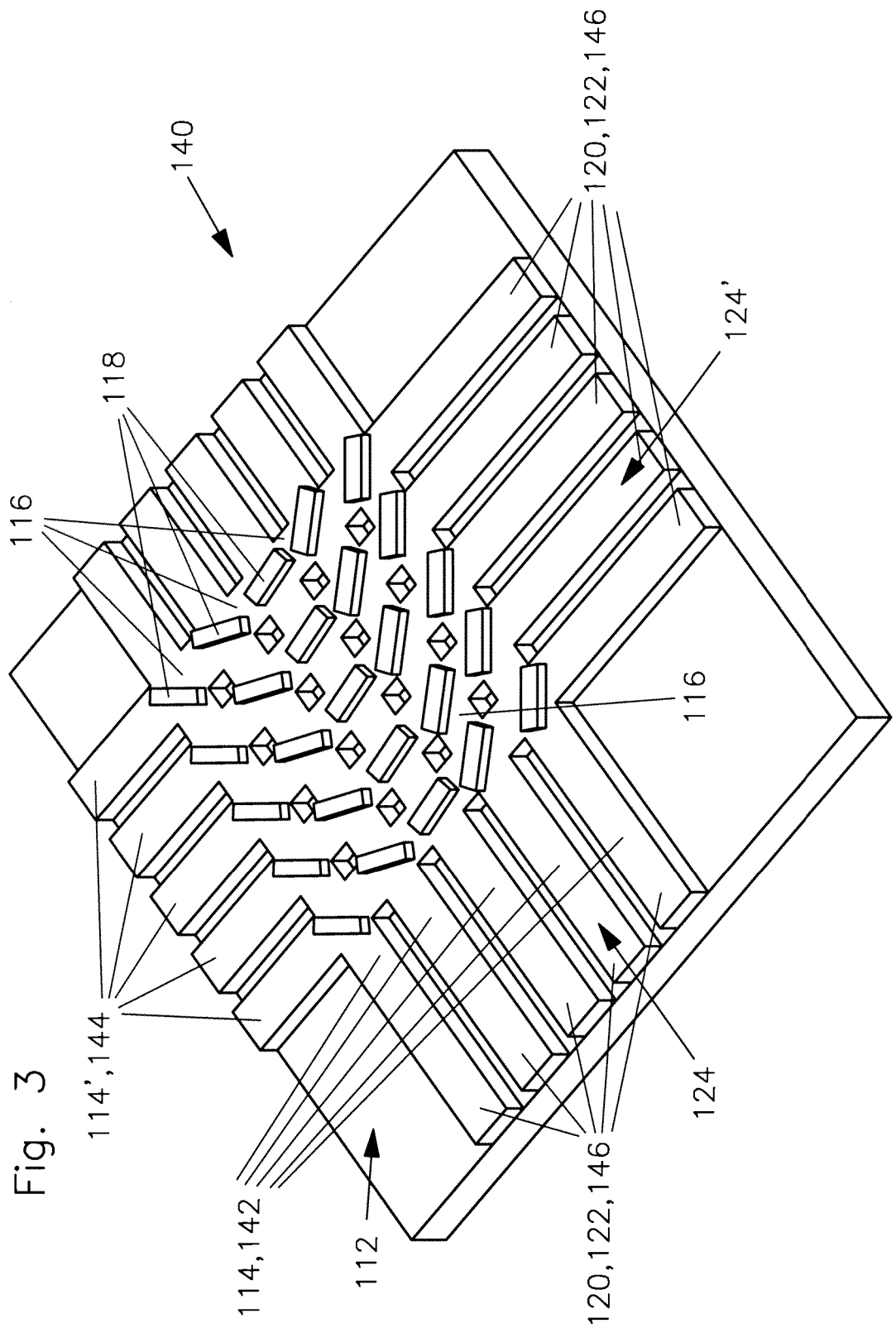

In the Figures:

FIG. 1 schematically shows an aerial view of a preferred embodiment of a nanophotonic device according to the present invention;

FIGS. 2A-2B schematically displays a side view of a preferred embodiment of a nanophotonic device, wherein A) a nanophotonic waveguide is employed, and B) an electronic waveguide is used; and FIG. 3 schematically shows an aerial view of a preferred embodiment of a nanophotonic matrix array according to the present invention;

FIG. 4 schematically displays a top view a preferred embodiment of a nanophotonic matrix array, in particular illustrating the addressability of a specific nanoscale element within of the nanophotonic matrix array.

DETAILED DESCRIPTION OF THE EMBODIMENTS

FIG. 1 schematically shows an aerial view of a preferred embodiment of a nanophotonic device 110 according to the present invention. On a transparent substrate 112, two waveguides 114, 114' are located in a manner that they comprise a common intersection point 116. In this particular embodiment, the two waveguides 114, 114' are arranged orthogonally with respect to each other, however, other arrangements are feasible where the two waveguides 114, 114' adopt an angle≠90° with respect to each other.

According to the present invention, the nanophotonic device 110 further comprises a nanoscale element 118 at the intersection point 116. The nanoscale element 118 is switchable between two different states, wherein the two states differ by a refractive index value. In the examplary nanophotonic device 110 as presented in FIG. 1, this feature is obtained by selecting the nanoscale element 118 to comprise the chalcogenide-based phase-change material (PCM) $Ge_2Sb_2Te_5$, usually abbreviated to "GST".

In addition, each waveguide comprises an optical port 120 at each of its end, wherein the optical port 120 is configured for providing a connection to an external optical fiber. For this purpose, the optical port 120 preferably comprises an optical grating coupler 122.

A preferred method for operating the nanophotonic device 110 according to the present invention comprises an injection of two optical pulses 124, 124' at the two waveguides 114, 114'. Since the two waveguides 114, 114' comprise an intersection point 116, the two optical pulses 124, 124' become superimposed at the intersection point 116. Accordingly, it is preferred to select an intensity of the two optical pulses 124, 124' in a manner that the superposition of the two optical pulses 124, 124' at the intersection point 116 is capable of switching the nanoscale element 118 located at the intersection point 116 into a desired state. Herein, the desired state of the nanoscale element 118 is selectable from two different states of the nanoscale element 118, i.e. an amorphous state and a crystalline state, wherein the two mentioned states differ by their refractive index value.

FIGS. 2A-2B schematically displays a side view of a preferred embodiment of the nanophotonic device 110. Herein, on a transparent glass substrate 112, a section of the waveguide 114 at the intersection point 116 is shown.

In the particular example as depicted in FIG. 2 A), the waveguide 114 comprises a wide-bandgap material, i.e. a nitride semiconductor material, selected here as silicon nitride SiN. In this embodiment, the waveguide 114 comprises a thin film, wherein the thin film exhibits a thickness in the range from 1 nm to 20 nm, preferably in the range from 5 nm to 10 nm. According to the present invention, on top of the waveguide 114 is located at the intersection point 116 the nanoscale element 118 which preferably also comprises a thin film, wherein the thin film exhibits a thickness in the range from 1 nm to 20 nm, preferably in the range from 5 nm to 10 nm. This particular arrangement allows a switching of the nanoscale element 118 within a single layer of waveguides 114 since the wide-bandgap material 126 of the waveguide 114 is at the same time optically transparent and electrically semiconducting. Consequently, the switching of the nanoscale element 118 may be performed optically and/or electrically.

Whereas the waveguides 114 is located here on a first side 128 of the substrate 112, also denoted as top of the substrate 112, the second side 130 of the substrate 112, which may also be denoted as bottom of the substrate 112, is covered by an antireflection coating 132. Herein, the antireflection coating 132 may comprise a coating material which may preferably be a dielectric which is transparent within the operation range of the device. Within this regard, preferred choices may include nitrides, oxides or also polymer coatings. In the nanophotonic device 100, the antireflection coating 132 may particularly be employed in order to reduce optical reflections that might occur at the bottom 130 of the substrate 112.

An alternative embodiment of the nanophotonic device 110 is shown in FIG. 2 B) in a further side view. Herein, the waveguides 114 comprise indium tin oxide (ITO) to be used as a transparent conducting oxide 134. Like in FIG. 2 A), the nanoscale element 118 is located at the intersection point 116. However, since the transparent conducting oxide 134 is used here as the material for the waveguides 114, electronic switching may be preferred in this embodiment, in particular since ITO is known as a material being suitable for electronic switching purposes.

FIG. 3 schematically shows an aerial view of a preferred embodiment of a nanophotonic matrix array 140 according to the present invention. On a common transparent substrate 112, a first plurality 142 of parallel waveguides 114 and a second plurality 144 of parallel waveguides 114 are located in a manner that the two pluralities 142, 144 of the waveguides 114 are arranged orthogonally with respect to each other. In this particular example as depicted in FIG. 3, each plurality 142, 144 comprises five separate parallel waveguides 114, however, other arrangements, such as arrangements which may comprise less or, preferably, more waveguides 114, which may also adopt an angle 90° with respect to each other, may further be feasible. In this particular example, each waveguide 114 of the first plurality 142 comprises an intersection point 116 with each waveguide 114 of the second plurality 144. However, arrangements are also possible, such as wherein not all waveguides 114 may exhibit an intersection point 116 with other waveguides 114'.

According to the present invention, preferably at each intersection point 116 a nanoscale element 118 is located. In the same manner as described above for the nanophotonic device 110, the nanoscale element 118 comprises the phase-change material GST, thus, providing the nanoscale element 118 to be switchable between two different states, wherein the two different states, i.e. an amorphous state and a crystalline state, of the nanoscale element 118 are known to differ by their refractive index value.

In addition, each plurality 142, 144 of waveguides 114 comprises here a plurality 146 of optical ports 120 which are configured for providing a connection to an external optical fiber array. Herein, each optical port 120 also comprises an optical grating coupler 122 as described above.

The method for operating the nanophotonic matrix array 140 is similar to the method for operating the nanophotonic device 110. Accordingly, two optical pulses 124, 124' are injected into a waveguide 114 of the first plurality 142 of waveguides 114 and into a waveguide 114 of the second plurality 144 of waveguides 114. At the respective intersection point 116, the two optical pulses 124, 124' superimpose in a manner that the nanoscale element 118 located at this intersection point 116 is switchable into the desired state as described above.

The addressability of a specific nanoscale element 118 within the nanophotonic matrix array 140 is schematically displayed in the top view according to FIG. 4. This Figure particularly emphasizes that each nanoscale element 118 within the nanophotonic matrix array 140 may be switched to the desired state by addressing the corresponding waveguides 114, 114' which comprise the intersection point 116 at which the nanoscale element 118 to be addressed is located. Simply by impinging a suitable optical pulse 124 to a waveguide 114 belonging to the first plurality 142 of waveguides and a second suitable optical pulse 124' to a second waveguide 114' which belongs to the second plurality 144 of waveguides may allow generating the conditions at the intersection point 116 which are required to switch the nanoscale element 118 located at this specific intersection point 116.

Consequently, the intersection points 116 of the nanophotonic matrix array 140 may be considered as pixels 148 of the nanophotonic matrix array 140 which may be individually addressed in order to create an arbitrary refractive index profile over an area 150 located within the nanophotonic matrix array 140. In particular since the nanoscale elements 116 in the nanophotonic matrix array 140 may be all-optically switched within a nanosecond or a picosecond time scale, the nanophotonic matrix array 140 according to the present invention may be used as an ultra-fast switching spatial light modulator (SLM) which is configured for operating at high frequencies, such as in the Gigahertz range.

LIST OF REFERENCE NUMBERS 110 nanophotonic device
112 (transparent) substrate
114, 114' waveguide
116 intersection point
118 nanoscale element
120 optical port
122 optical grating coupler
124, 124' optical pulse
126 wide-bandgap material (SiN)
128 first side (top) of substrate
130 second side (bottom) of substrate
132 anti-reflection coating
134 transparent conducting oxide (ITO)
140 nanophotonic matrix array
142 first plurality of waveguides
144 second plurality of waveguides
146 plurality of optical ports
148 pixel
150 area

The invention claimed is:

1. A nanophotonic device, comprising:
a transparent substrate;
at least two waveguides located on top of the substrate, wherein the at least two waveguides comprise an intersection point, wherein, at the intersection point, a part of a first waveguide simultaneously constitutes a part of a second waveguide; and
a nanoscale element located on top of an area formed by the intersection point in a manner that it partially or completely covers the intersection point, wherein the nanoscale element is switchable between two different states based on an intensity of light at the intersection point, wherein the two states of the nanoscale element differ by a refractive index value.

2. The nanophotonic device of claim 1, wherein the nanoscale element comprises a phase-change material.

3. The nanophotonic device of claim 2, wherein the phase-change material comprises a chalcogenide glass.

4. The nanophotonic device of claim 3, wherein the phase-change material comprises $Ge_2Sb_2Te_5$ (GST).

5. The nanophotonic device of claim 1, wherein the nanoscale element comprises a thin film, wherein the thin film exhibits a thickness from 1 nm to 20 nm.

6. The nanophotonic device of claim 5, wherein the thin film exhibits a thickness from 5 nm to 10 nm.

7. The nanophotonic device of claim 1, wherein the at least two waveguides comprise a wide-bandgap material, a transparent conducting oxide, or silicon.

8. The nanophotonic device of claim 7, wherein the wide-bandgap material is aluminum nitride or silicon nitride.

9. The nanophotonic device of claim 7, wherein the transparent conducting oxide comprises indium tin oxide.

10. The nanophotonic device of claim 1, wherein the waveguides comprise a thin film, wherein the thin film exhibits a thickness from 1 nm to 20 nm.

11. The nanophotonic device of claim 10, wherein the thin film exhibits a thickness from 5 nm to 10 nm.

12. The nanophotonic device of claim 1, wherein the waveguides comprise at least one optical port being configured for providing a connection to an external optical fiber, wherein the optical port comprises an optical grating coupler.

13. The nanophotonic device of claim 1, wherein the substrate comprises a transparent material selected from glass, quartz, or sapphire.

14. The nanophotonic device of claim 1, wherein the substrate further comprises an anti-reflection coating.

15. A method for manufacturing a nanophotonic device of claim 1, comprising:
(a) providing a transparent substrate;
(b) depositing a layer of a wide-bandgap material, of a transparent conducting oxide, or of silicon onto the substrate;
(c) nanostructuring at least two waveguides into the layer in a manner that the at least two waveguides comprise an intersection point, wherein, at the intersection point, a part of a first waveguide simultaneously constitutes a part of a second waveguide; and
(d) placing a nanoscale element on top of an area formed by the intersection point in a manner that it partially or completely covers the intersection point, wherein the nanoscale element is selected as being switchable between two different states based on an intensity of light at the intersection point, wherein the two states of the nanoscale element differ by a refractive index value.

16. The method of claim 15, further comprising the step:
(e) providing at least one optical port for providing a connection to an external optical fiber.

17. The method of claim 16, wherein a optical grating coupler is provided as the at least one optical port.

18. A method for operating a nanophotonic device of claim 1, wherein at least two optical pulses are injected into at least two waveguides, wherein the at least two waveguides comprise an intersection point, wherein an intensity of the at least two optical pulses is selected in a manner that a superposition of the at least two optical pulses at the intersection point switches a nanoscale element located at the intersection point into a desired state, wherein the desired state is selectable from two different states of the nanoscale element, wherein the two of the states nanoscale element differ by a refractive index value.

19. A nanophotonic matrix array, wherein a first plurality of parallel waveguides and a second plurality of parallel waveguides are located on a common substrate, thereby forming a plurality of nanophotonic devices of claim 1.

20. The nanophotonic matrix array of claim 19, wherein each plurality of waveguides comprise a plurality of optical ports being configured for providing a connection to an external optical fiber array, wherein each optical port comprises an optical grating coupler.

21. A spatial light modulator comprising an array of individually addressable refractive index pixels which may be tuned with respect to their refractive index in order to allow a spatial modulation of a light beam with respect to its intensity and/or phase, wherein a nanophotonic matrix array of claim 19 constitutes the array of the individually addressable refractive index pixels.

* * * * *